United States Patent
Vu et al.

(10) Patent No.: US 10,047,617 B2
(45) Date of Patent: Aug. 14, 2018

(54) GAS TURBINE ENGINE AIRFOIL PLATFORM EDGE GEOMETRY

(71) Applicant: United Technologies Corporation, Hartford, CT (US)

(72) Inventors: Ky H. Vu, East Hartford, CT (US); Lisa P. O'Neill, Manchester, CT (US); Takao Fukuda, East Hartford, CT (US); Gerald M. Mace, Jr., Wallingford, CT (US); Andy Turko, Southington, CT (US); Andrew P. Boursy, Marlborough, CT (US); Lynn M. Boy, Durham, CT (US)

(73) Assignee: United Technologies Corporation, Farmington, CT (US)

( * ) Notice: Subject to any disclaimer, the term of this patent is extended or adjusted under 35 U.S.C. 154(b) by 255 days.

(21) Appl. No.: 14/780,573

(22) PCT Filed: Apr. 7, 2014

(86) PCT No.: PCT/US2014/033148
§ 371 (c)(1),
(2) Date: Sep. 28, 2015

(87) PCT Pub. No.: WO2014/209464
PCT Pub. Date: Dec. 31, 2014

(65) Prior Publication Data
US 2016/0053621 A1    Feb. 25, 2016

Related U.S. Application Data

(60) Provisional application No. 61/813,248, filed on Apr. 18, 2013.

(51) Int. Cl.
*F01D 9/04* (2006.01)
*F01D 5/14* (2006.01)

(52) U.S. Cl.
CPC .............. *F01D 9/041* (2013.01); *F01D 5/14* (2013.01); *F01D 5/143* (2013.01);
(Continued)

(58) Field of Classification Search
CPC ............. F05D 2240/80; F05D 2250/70; F05D 2250/71; F05D 2240/81; F01D 5/14;
(Continued)

(56) References Cited

U.S. PATENT DOCUMENTS 5,924,699 A    7/1999  Airey et al.
6,572,335 B2   6/2003  Kuwabara et al.
(Continued)

FOREIGN PATENT DOCUMENTS

EP    2540986    1/2013

OTHER PUBLICATIONS

EP Search Report for EP Application No. 14817409.7 dated Jun. 21, 2016.
(Continued)

*Primary Examiner* — Woody Lee, Jr.
*Assistant Examiner* — Sang K Kim
(74) *Attorney, Agent, or Firm* — Carlson, Gaskey & Olds, P.C.

(57) ABSTRACT

An airfoil component for a gas turbine engine includes a platform. The airfoil component includes a flow path surface from which an airfoil extends. A laterally extending aft surface is adjacent to the flow path surface. A contoured surface adjoins the flow path surface and the aft surface. An airfoil component for a gas turbine engine includes a platform. The airfoil component includes a flow path surface from which an airfoil extends. A laterally extending aft surface is adjacent to the flow path surface. A contoured surface adjoins the flow path surface and the aft surface. The aft surface extends from a first aft edge to a second aft edge (Continued)

at a circumferentially extending edge. The contoured surface is arranged inboard from at least one of the first and second edges.

3 Claims, 6 Drawing Sheets

(52) U.S. Cl.
CPC ...... *F05D 2240/57* (2013.01); *F05D 2240/81* (2013.01); *F05D 2250/19* (2013.01); *F05D 2250/192* (2013.01); *Y02T 50/672* (2013.01); *Y02T 50/673* (2013.01); *Y02T 50/676* (2013.01)

(58) Field of Classification Search
CPC .......... F01D 5/143; F01D 9/04; Y02T 50/672; Y02T 50/673; Y02T 50/676
See application file for complete search history.

(56) References Cited

U.S. PATENT DOCUMENTS

| | | | |
|---|---|---|---|
| 6,739,837 B2 | 5/2004 | Barnette et al. | |
| 6,846,159 B2 | 1/2005 | Zabawa et al. | |
| 7,134,842 B2 | 11/2006 | Tam et al. | |
| 7,153,098 B2 | 12/2006 | Zabawa | |
| 8,206,115 B2* | 6/2012 | Gupta | F01D 5/143 415/211.2 |
| 8,231,353 B2 | 7/2012 | Siden et al. | |
| 8,287,241 B2 | 10/2012 | Strohl et al. | |
| 8,297,935 B2 | 10/2012 | Mitlin et al. | |
| 8,356,975 B2 | 1/2013 | Grover et al. | |
| 2006/0275126 A1 | 12/2006 | Heitland et al. | |
| 2008/0145208 A1 | 6/2008 | Klasing et al. | |
| 2010/0143139 A1 | 6/2010 | Pandey et al. | |
| 2010/0158696 A1 | 6/2010 | Pandey et al. | |
| 2010/0172749 A1 | 7/2010 | Mitsuhashi et al. | |
| 2011/0044818 A1 | 2/2011 | Kuhne et al. | |
| 2011/0243749 A1 | 10/2011 | Praisner et al. | |
| 2013/0089430 A1 | 4/2013 | Stein et al. | |
| 2013/0224014 A1* | 8/2013 | Aggarwala | F01D 5/143 415/220 |
| 2013/0315745 A1* | 11/2013 | Aggarwala | F01D 5/141 416/223 A |

OTHER PUBLICATIONS

International Preliminary Report on Patentability for Application No. PCT/US2014/033148 dated Oct. 29, 2015.
International Search Report and Written Opinion for PCT Application No. PCT/US2014033148, dated Jan. 9, 2015.

* cited by examiner

GAS TURBINE ENGINE AIRFOIL PLATFORM EDGE GEOMETRY

BACKGROUND

This disclosure relates to an airfoil platform for a gas turbine engine, and more particularly, the disclosure relates to a platform edge geometry.

Gas turbine engines typically include a compressor section, a combustor section and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine loads.

A typical turbine section includes at least one array of stator vanes. Each stator vane includes spaced apart inner and outer platforms joined to one another by an airfoil. The inner platform includes spaced apart circumferentially adjacent lateral surfaces. Lateral surfaces of adjacent stator vanes are in close proximity to one another. A small gap is provided between the adjacent lateral surfaces, and a feather seal is provided between the adjacent lateral surfaces to seal the inner flow path provided by the inner platform.

The adjacent lateral surfaces are parallel to one another and extend in a radial direction with respect to a rotational axis of the compressor and turbine sections. The lateral surfaces and forward and aft surfaces provide a sharp, generally right-angled corner with respect to an inner flow path surface provided by the inner platform.

SUMMARY

In one exemplary embodiment, an airfoil component for a gas turbine engine includes a platform. The airfoil component includes a flow path surface from which an airfoil extends. A laterally extending aft surface is adjacent to the flow path surface. A contoured surface adjoins the flow path surface and the aft surface.

In a further embodiment of the above, the airfoil component includes inner and outer platforms joined by the airfoil. One of the inner and outer platforms provides the platform.

In a further embodiment of the above, the platform is provided by an inner platform.

In a further embodiment of the above, the contoured surface is without cooling holes.

In a further embodiment of the above, the contoured surface provided by a generally uniform radius.

In a further embodiment of the above, the lateral surface extends from a first aft edge to a second aft edge at a circumferentially extending edge. The radius extends to the first and second aft edges. The platform has a thickness.

In a further embodiment of the above, a ratio of thickness to the generally uniform radius is about 4:1 to 10:1.

In a further embodiment of the above, a ratio of thickness to the generally uniform radius is about 1:1.

In a further embodiment of the above, the aft surface includes a flat, planar ledge that adjoins the generally uniform radius and is opposite the flow path surface.

In a further embodiment of the above, the ledge has a width of 0.00-0.05 inch (0.00-1.27 mm).

In a further embodiment of the above, the thickness is about 0.10-0.20 inch (2.54-5.08 mm).

In another exemplary embodiment, an airfoil component for a gas turbine engine includes a platform. The airfoil component includes a flow path surface from which an airfoil extends. A laterally extending aft surface is adjacent to the flow path surface. A contoured surface adjoins the flow path surface and the aft surface. The aft surface extends from a first aft edge to a second aft edge at a circumferentially extending edge. The contoured surface is arranged inboard from at least one of the first and second edges.

In a further embodiment of the above, the contoured surface is arranged inboard of both the first and second aft edges.

In a further embodiment of the above, non-radiused edges are provided between the contoured surface and the first and second aft edges.

In a further embodiment of the above, the aft surface extends a first length. The non-radiused edges extend second and third lengths. The second and third lengths are 10-20% of the first length.

In a further embodiment of the above, the contoured surface included a radius portion and a transition portion blending from the radius portion to the non-radius edges.

In a further embodiment of the above, the platform has a thickness of about 0.10-0.20 inch (2.54-5.08 mm).

In a further embodiment of the above, the platform is provided by an inner platform.

In a further embodiment of the above, the contoured surface is without cooling holes.

BRIEF DESCRIPTION OF THE DRAWINGS

The disclosure can be further understood by reference to the following detailed description when considered in connection with the accompanying drawings wherein.

DETAILED DESCRIPTION

Figure 1:
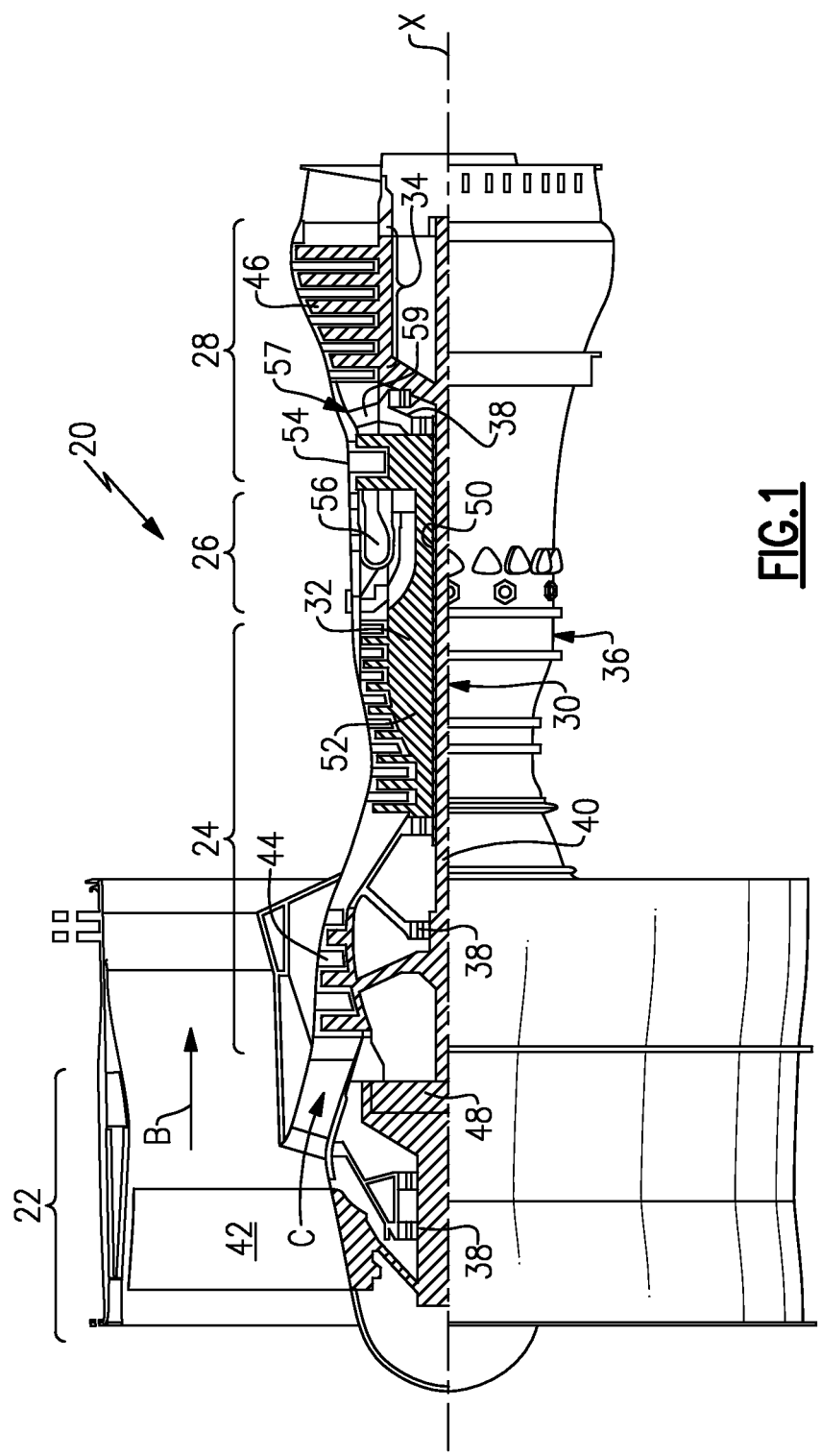
FIG. 1 schematically illustrates a gas turbine engine embodiment.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis X relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis X.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about five (5). The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 57 of the engine static structure 36 is arranged generally between the high pressure turbine 54 and the low pressure turbine 46. The mid-turbine frame 57 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 57 includes vanes 59, which are in the core airflow path and function as an inlet guide vane for the low pressure turbine 46. Utilizing the vane 59 of the mid-turbine frame 57 as the inlet guide vane for low pressure turbine 46 decreases the length of the low pressure turbine 46 without increasing the axial length of the mid-turbine frame 57. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft./sec divided by an industry standard temperature correction of $[(Tram\ °R)/(518.7°R)]^{0.5}$. The "Low corrected fan tip speed", as disclosed herein according to one non-limiting embodiment, is less than about 1150 ft./second.

Figure 2:
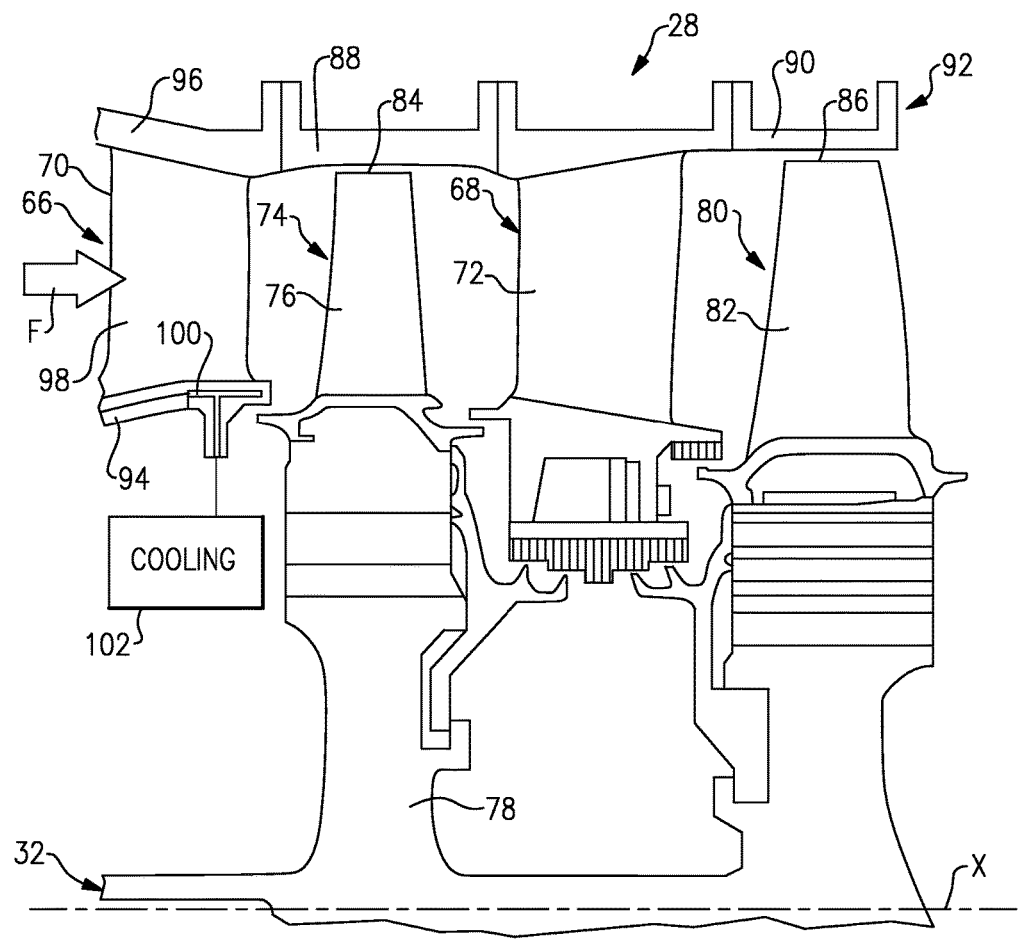
FIG. 2 is a cross-sectional view through a turbine section.

Referring to FIG. 2, a cross-sectional view through the turbine section 28 is illustrated. In the example turbine section 28, first and second arrays 66, 68 of circumferentially spaced fixed vanes 70, 72 are axially spaced apart from one another. A first stage array 74 of circumferentially spaced turbine blades 76, mounted to a rotor disk 78, is arranged axially between the first and second fixed vane arrays 70, 72. A second stage array 80 of circumferentially spaced turbine blades 82 is arranged aft of the second array 68 of fixed vanes 72.

The turbine blades 76, 82 each include a tip 84, 86 adjacent to a blade outer air seals 88, 90 of a case structure 92. The first and second stage arrays 66, 68 of turbine vanes and first and second stage arrays 74, 80 of turbine blades are arranged within a flow path F and are operatively connected to the shaft 32, which is rotatable about an axis X.

Each vane, by way of example, vane 70, includes an inner platform 94 and an outer platform 96 respectively defining inner and outer flow paths. The platforms 94, 96 are interconnected by an airfoil 98 extending in a radial direction with respect to the axis X of the shaft 32. It should be understood that the turbine vanes may be discrete from one another or arranged in integrated clusters.

The turbine vanes are constructed from a high strength, heat resistant material such as a nickel-based or cobalt-based superalloy, or of a high temperature, stress resistant ceramic or composite material. In cooled configurations, internal cooling passages 100 receive cooling fluid from a cooling source 102, such as compressor bleed air. The internal cooling passages 100 may provide the cooling fluid to cooling holes on the platform and/or airfoil to provide for a combination of impingement and film cooling. In addition, one or more thermal barrier coatings, abrasion-resistant coatings or other protective coatings may be applied to the turbine vane.

Figure 3:
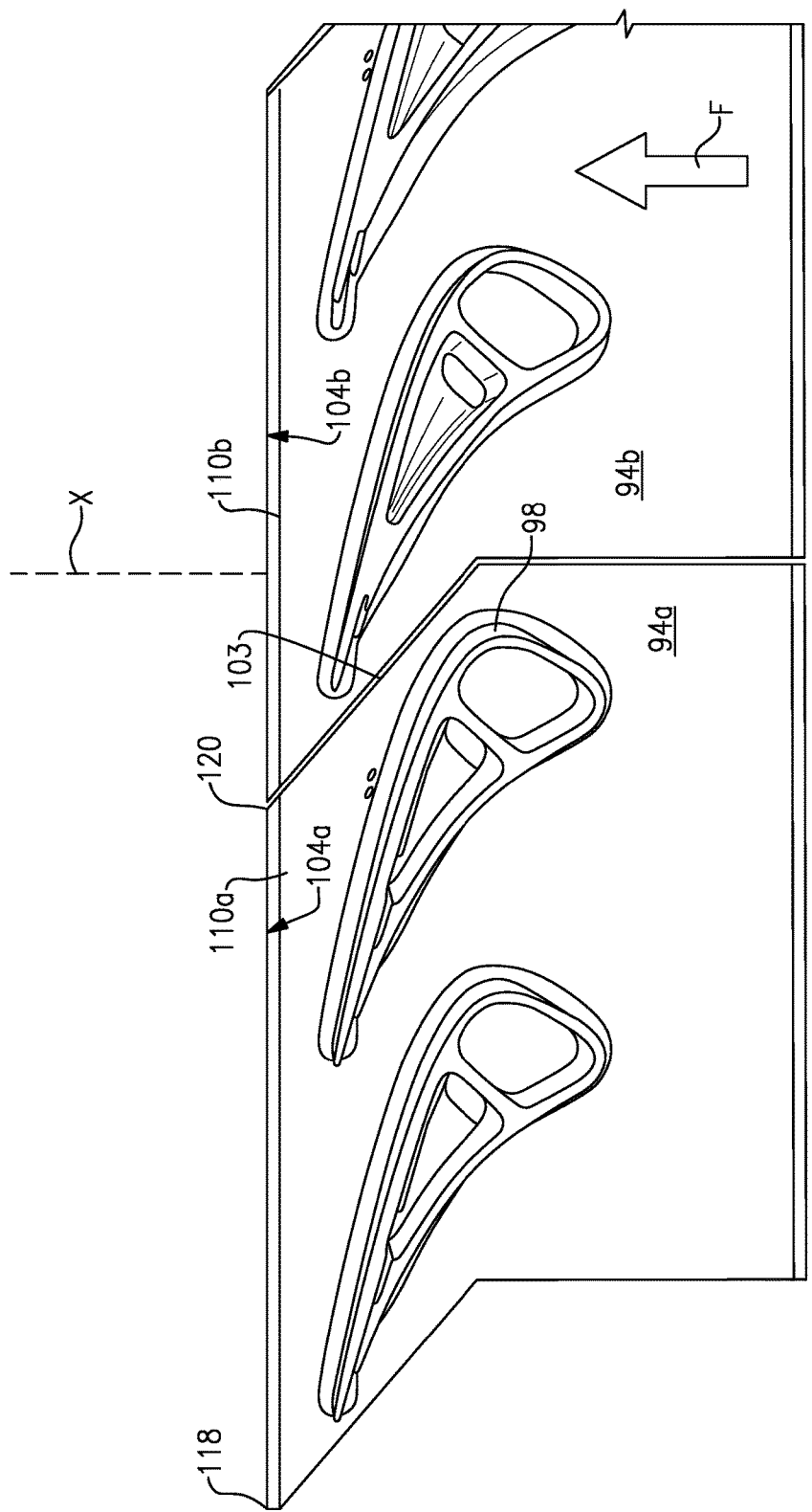
FIG. 3 is an elevational view of the adjacent inner platforms.
Figure 4:
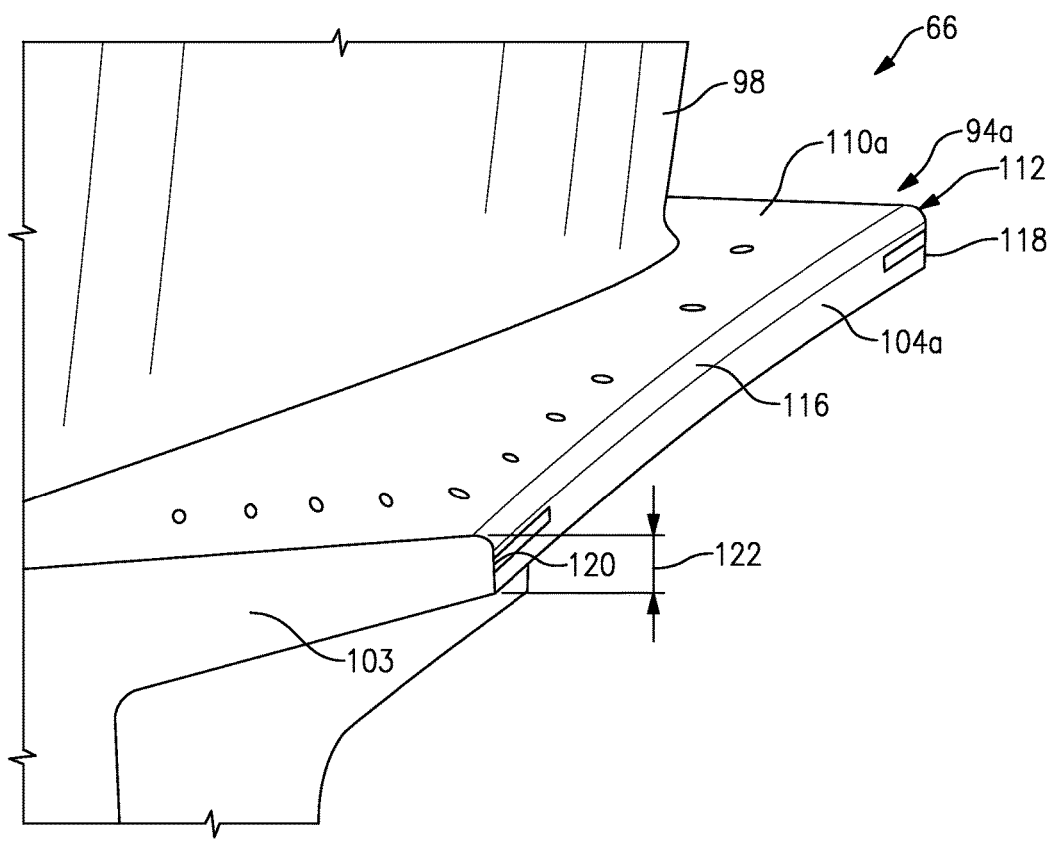
FIG. 4 is an enlarged perspective view of an inner platform and one of the aft surfaces.
Figure 5:
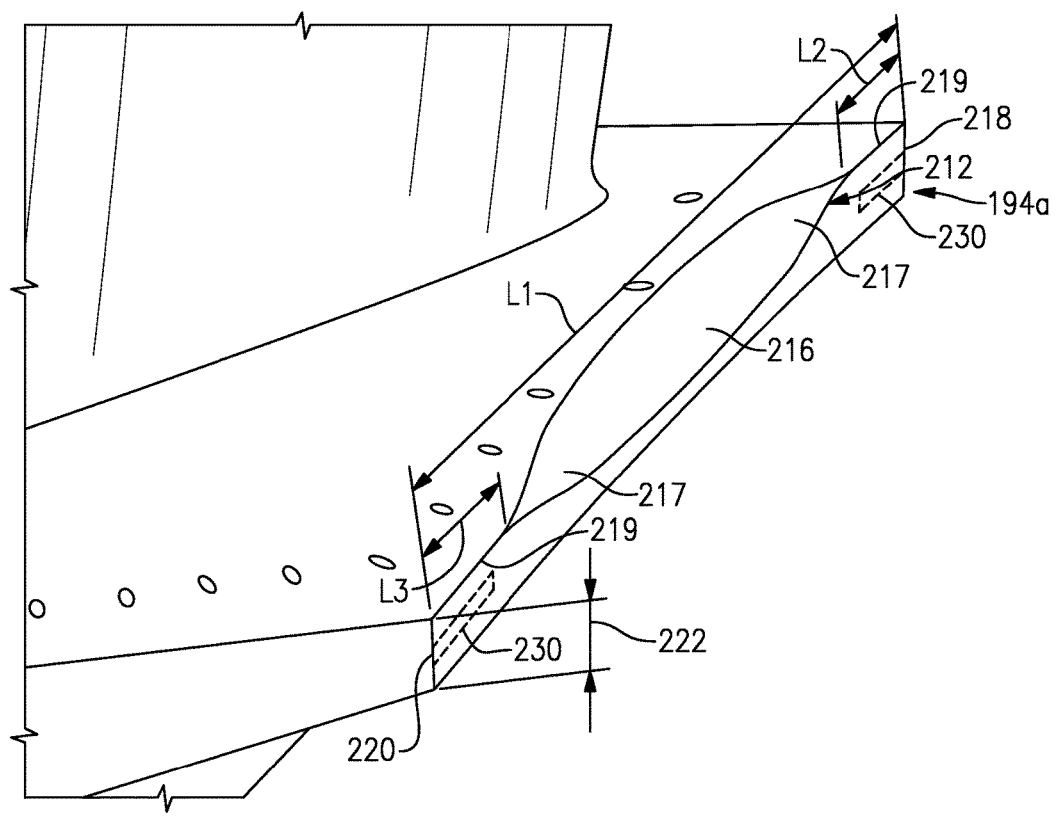
FIG. 5 is an enlarged perspective view of another inner platform and one of the aft surfaces.
Figure 6:
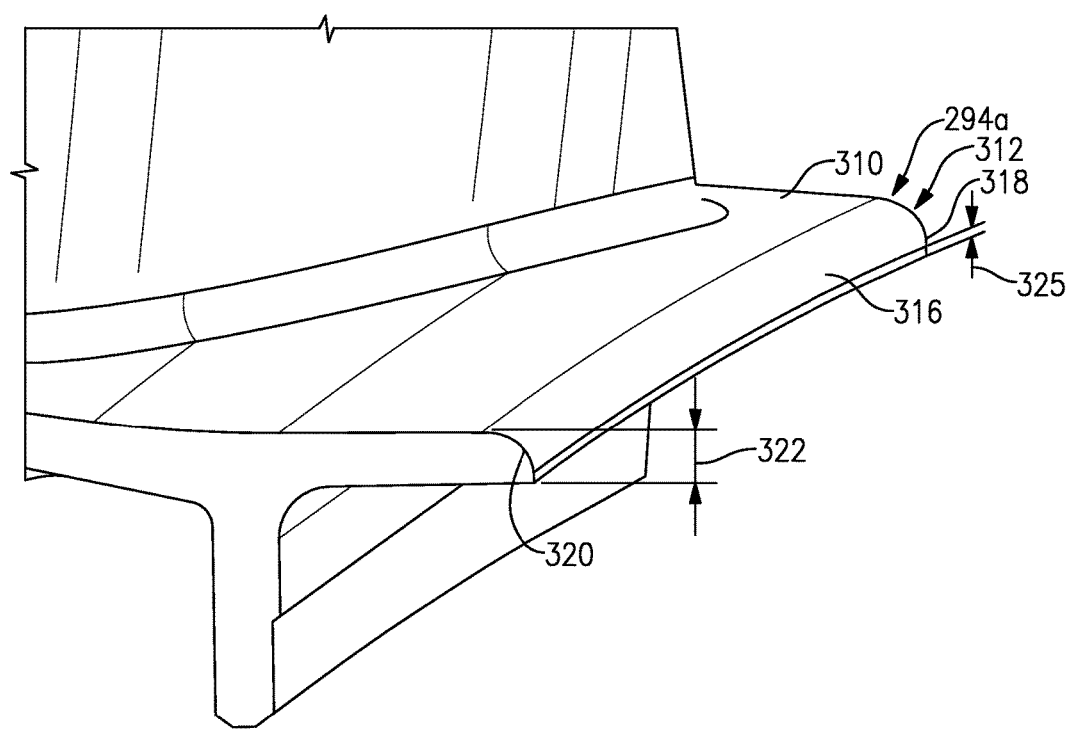
FIG. 6 is an enlarged perspective view of yet another inner platform and one of the aft surfaces.

Generally speaking, like numerals are used for like features in FIGS. 4-6. Referring to FIGS. 3-4, the inner platform 94a supports the airfoil 98 in a stage 66. The inner platform 94a includes an inner flow path surface 110a defining the inner portion of the flow path F. The inner flow path surface 110a and a lateral surface 104a, which is planar in the example, are generally at a right angle with respect to one another. As shown in FIG. 3, the laterally extending aft surface 104a is approximately 45° relative to an angularly extending edge 103 provided on the inner platform. A contoured surface 112 adjoins the inner flow path surface 110a and the lateral surface 104a, which extends radially with respect to the axis X, shown in FIG. 2. A laterally extending aft surface 104b of the adjacent vane platform 94b adjoins its inner flow path surface 110b (FIG. 3). In the example, no cooling holes are provided in the contoured surface 112.

The contoured surface 112 is provided between and interconnects the inner flow path surface 110a and the aft surface 104a. The contoured surface 112 may be provided by a variety of shapes. In the example shown in FIG. 4, the platform 94a includes thickness 122, which may be in the range of 0.100-0.20 inch +/−0.05 inch (2.54-5.08 mm+/− 1.27 mm), for example. The contoured surface 112 is provided by a generally uniform radius 116 adjoining the inner flow path surface 110a and the lateral surface 104a. The radius 116 extends to first and second spaced apart aft edges 118, 120. The first aft edge 118 is provided at an intersection of the aft surface 104a and an aft edge 101 of the platform 94a, and the second aft edge 120 is provided at an intersection of the aft edge 104a and the angularly extending edge 103. In the example, the ratio of the platform width 122 to the radius 116 is about 4:1 to 10:1.

Another example platform geometry is illustrated in FIG. 5. The contoured surface 212 is provided on platform 194a and spaced interiorly of the first and second edges 218, 220. In one example, the edges 218, 220 are spaced apart from one another a length L1. The contoured surface 212 is spaced from the first and second edges 218, 220 respectively a length L2, L3. In one example, each of the lengths L2, L3 is 10-20% of L1. The contoured surface transitions from a large radius surface 216 that may have a ratio with respect to the platform thickness 222 of 0.5:1 to 1:1. The contoured surface 212 has transition regions 217 that adjoin the radius surface 216 and blend into non-radiused portions 219. The non-radiused portions 219 may be circumferentially aligned with feather seal slots, indicated in the area of the dashed lines 230. Feather seals extend between adjacent feather seal slots in adjacent platforms, as is known.

A configuration similar to FIG. 4 is shown in FIG. 6. In the example illustrated in FIG. 6, the contoured region 312 provided on the platform 294a includes a large radius 316 that extends to the first and second spaced apart edges 318, 320. The radius 316 is approximately equal to the platform thickness 322, that is, about 1:1. However, a small ledge having a width 325 may be provided opposite the inner flow path surface 310. In one example, the width 325 is in the range of less than 0.05 inch (1.27 mm).

The disclosed airfoil platform may be used in commercial and military aircraft engines as well as industrial gas turbine engines. The platform may be provided in blades and/or vanes of one or more stages. In the examples, the platforms are shown as part of stator vanes in the turbine section 28, but it should be understood that the platforms may also be used in a fan or compressor section. The disclosed platform geometry, which may be used on inner and/or outer platforms, may improve TSFC up to 0.2% depending upon engine operating condition.

Although an example embodiment has been disclosed, a worker of ordinary skill in this art would recognize that certain modifications would come within the scope of the claims. For example, the disclosed platform contour may be used for other airfoil components, such as blades. For that reason, the following claims should be studied to determine their true scope and content.

What is claimed is:

1. An airfoil component for a gas turbine engine comprising: a platform including a flow path surface from which an airfoil extends, a laterally extending aft surface adjacent to the flow path surface, and a contoured surface adjoining the flow path surface and the aft surface, wherein the aft surface extends from a first aft edge to a second aft edge at a circumferentially extending edge, the contoured surface arranged inboard from at least one of the first and second edges, wherein the contoured surface is arranged inboard of both the first and second aft edges, wherein non-radiused edges are provided between the contoured surface and the first and second aft edges.

2. The airfoil component according to claim 1, wherein the aft surface extends a first length, and the non-radiused edges extend second and third lengths, the second and third lengths 10-20% of the first length.

3. The airfoil component according to claim 1, wherein the contoured surface included a radius portion and a transition portion blending from the radius portion to non-radius edges.

* * * * *